(12) United States Patent
Chaney (10) Patent No.: US 11,690,322 B1
(45) Date of Patent: Jul. 4, 2023

(54) BALER INDEPENDENT NEEDLE DRIVE

(71) Applicant: Deere & Company, Moline, IL (US)

(72) Inventor: Nathan A. Chaney, Bloomfield, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/832,819

(22) Filed: Jun. 6, 2022

(51) Int. Cl.
*A01F 15/14* (2006.01)
*A01F 15/08* (2006.01)

(52) U.S. Cl.
CPC ........ *A01F 15/0858* (2013.01); *A01F 15/145* (2013.01); *A01F 2015/0866* (2013.01)

(58) Field of Classification Search
CPC ................ A01F 15/0858; A01F 15/145; A01F 2015/0866
See application file for complete search history.

(56) References Cited

U.S. PATENT DOCUMENTS

| | | | | |
|---|---|---|---|---|
| 3,366,036 | A  * | 1/1968 | May ..................... | A01F 15/0858 192/26 |
| 2014/0290504 | A1 | 10/2014 | Lang | |
| 2018/0077872 | A1* | 3/2018 | Maelfeyt ............... | A01F 15/145 |
| 2018/0116123 | A1 | 5/2018 | Chaney | |
| 2019/0116735 | A1* | 4/2019 | Lang ....................... | B65B 13/26 |
| 2021/0337738 | A1* | 11/2021 | Meiners .............. | A01F 15/0858 |

* cited by examiner

*Primary Examiner* — Jimmy T Nguyen
(74) *Attorney, Agent, or Firm* — Tucker Ellis LLP; Michael G. Craig; Heather M. Barnes (57) ABSTRACT

One or more techniques and/or systems are disclosed for an independent needle drive system for an agricultural baler. Typical balers utilize a knotter drive shaft to operate both the knotter drive and needle drive. In this innovation, the knotter drive shaft and needle drive are independently operated to provide additional uses for the rotation of the knotter drive shaft. An independent needle drive crank arm free-floats on a smooth portion of the knotter drive shaft, and a knotter clutch is engaged separately on a splined portion. Rotation of a clutch bowl engages the knotter clutch and knotter shaft independently from the needle crank arm. In this way, the needle drive and knotter drive can operate independently from each other.

20 Claims, 6 Drawing Sheets

BALER INDEPENDENT NEEDLE DRIVE

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler. Balers usually include a knotter system for tying twine around the bale before the bale is ejected from the baler chamber. Needles delivery twine through the baling chamber to the knotter system. To operate properly the knotter system requires the twine to move properly without snagging on parts of the baler so that the twine is positioned by a needle for proper knotting by the system. The system itself carries out a choreographed sequence of operations, which is can be subject to malfunction if the twine is not properly routed by the needle to the knotters.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an independent needle drive system for a baler that separates the activation of the needle drive from the activation of the knotter shaft drive. That is, the respective drives are provided power independently of each other, which allows for a gain of use for the knotter intermittent gear to perform other functions later in the knotting cycle. The timing of the power supplied to the knotter drive shaft can be separated from the timing of the power supplied to the needle drive, such that the prior dwell time for the knotter drive shaft can be used for other purposes.

In one implementation of a knotter system for a baler, a clutch bowl can be engaged with a gear box to provide rotational power to the clutch bowl. The clutch bowl can comprise a first clutch pocket disposed in an interior wall of the clutch bowl proximate to the gear box; and a second clutch pocket disposed in the interior wall of the clutch bowl distally from the first clutch pocket with respect to the gear box. The first and second clutch pockets radially offset from each other. A knotter driven shaft has a center of rotation disposed along a first axis, and the knotter driven shaft extends through the gear box in a free-floating, rotational arrangement. In this implementation, a knotter shaft clutch is engaged with the knotter driven shaft such that the knotter shaft clutch and knotter driven shaft operably rotate together. Further, the knotter shaft clutch comprises a first clutch dog that operably engages with the first clutch pocket to provide rotational power to the knotter shaft clutch. Additionally, a needle drive crank arm is disposed on the knotter driven shaft, and the needle drive crank arm comprises a second clutch dog that operably engages with the second clutch pocket to provide rotational power to the needle drive crank arm.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

An independent needle drive system for a baler can be devised that separates the timing of the needle drive from the timing of the knotter shaft drive. In this way, for example, more room is gained on the knotter intermittent gear (e.g., in degrees of usable rotation) to perform other functions later in the tie cycle. Currently, over a third of the knotter shaft rotation is unusable to other knotter functions because the needles are moved by the drive up into position during that rotation.

With the innovation of the independent needle drive system, described herein, the needles can be triggered to start moving without engaging the knotter shaft drive, for example. In this example, the knotter shaft clutch can engage a second pawl, such as the inner pawl on some models, to begin the knotting process. Further, the needles will drive down and de-clutch while the knotter shaft clutch is still engaged. The extra time at the end of the cycle may be used for any number of additional functions driven by the knotter shaft itself. Additionally, the needle drive crank arm can sit suspended on the knotter shaft, as later described, and only be driven by the outer pawl in the drive bowl, for example. In some implementations, an independent needle frame brake or retention device can be used to mitigate unwanted motion when the needles are de-clutched.

In some implementations, modifications to an existing knotter, described further below, may include a new geometry inner clutch triangle, with cantilever de-clutch arm, in order to reach outside a clutch extended bowl. Further, a declutching stop/trip arm on the baler frame may be designed to strike both the outer and inner clutch triangle declutching arms, to declutch the respective drives. Additionally, the reset portion of the needle lift crank may be re-designed to accommodate the passing of the knotter shaft clutch pawl before resetting. For example, the adjustment may be only a slight (e.g., 30-40 degree) delay from existing geometry.

Figure 1:
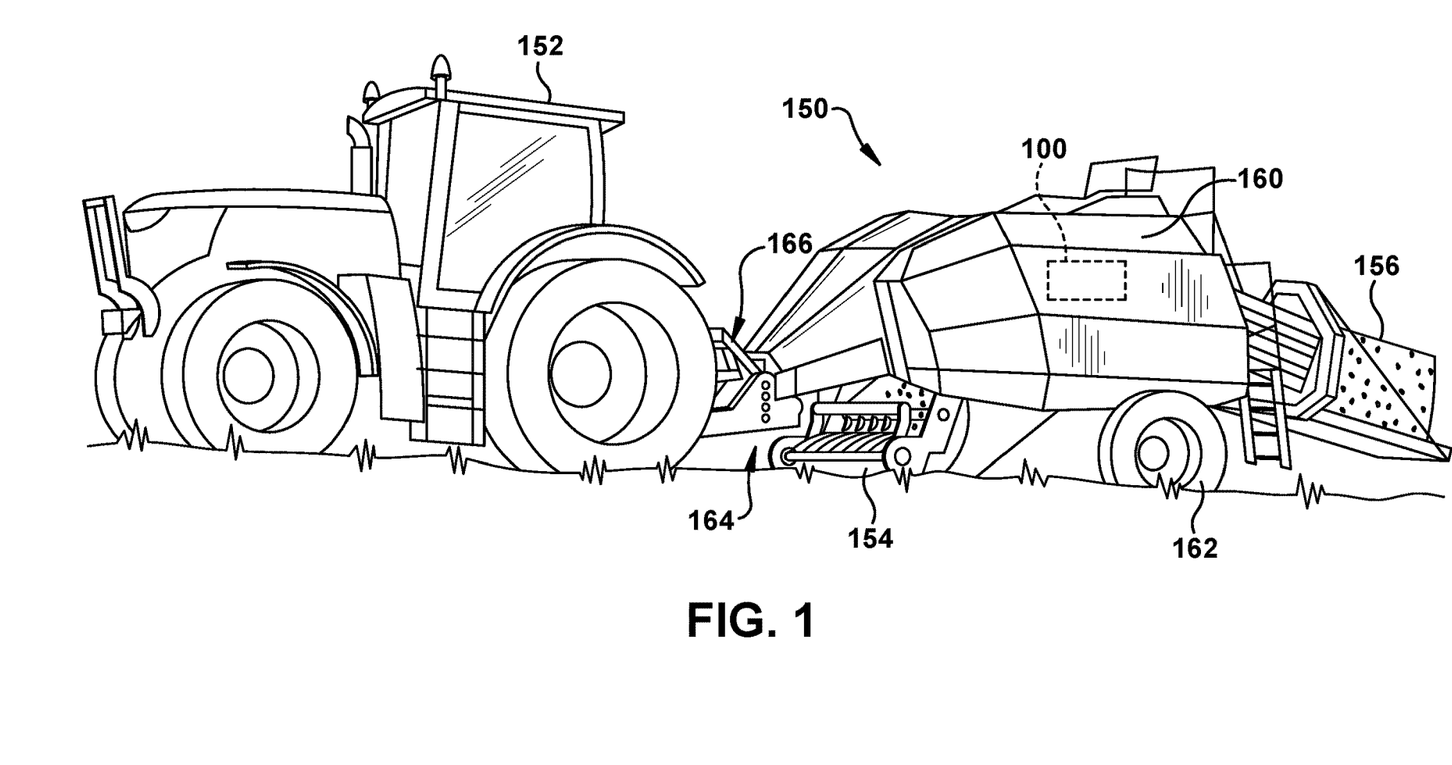
FIG. 1 is a component diagram illustrating an example vehicle and work implement where one or more portions of one or more systems described herein may be implemented.

FIG. 1 is a component diagram illustrating an example embodiments where one or more portions of one or more systems described herein may be implemented. In this example, an agricultural harvesting machine 150, such as a baler, may comprise an implementation of an independent needle drive 100, as described herein. In this example, a large square baler is shown, but the systems and techniques described herein may also be applied to other balers and harvesting machines. As illustrated, the agricultural harvesting machine 150 may be coupled to an agricultural vehicle 152, such as a tractor, or the agricultural harvesting machine 150 may be alternately self-propelled. In some implementations, the agricultural harvesting machine 150 may be combined or integrated with a cotton harvester, a combine harvester, or other harvesting machines.

In this implementation, as depicted in FIG. 1, the baler 150 may comprise a frame 160, ground engaging devices 162, such as wheels or tracks, a hitch 164 for attachment to the tractor 152, or other vehicle, and a power input shaft 166, such as a power-take-off (PTO) shaft, which can receive rotational power from a tractor 152. Further, the baler 150 can comprise a crop pick-up mechanism 154 (e.g., input or gatherer), and the tractor 152 can tow the baler 150 across a field and gather and process crop material to form a crop package 156, such as a bale. In this example, power provided by the input shaft 166 can function to operate the mechanisms of the baler 150, such as the independent needle drive 100, pick-up mechanism 154, and other processing mechanisms. The baler 150 may then eject the formed bale 156 from the rear of the baler 150.

Figure 2:
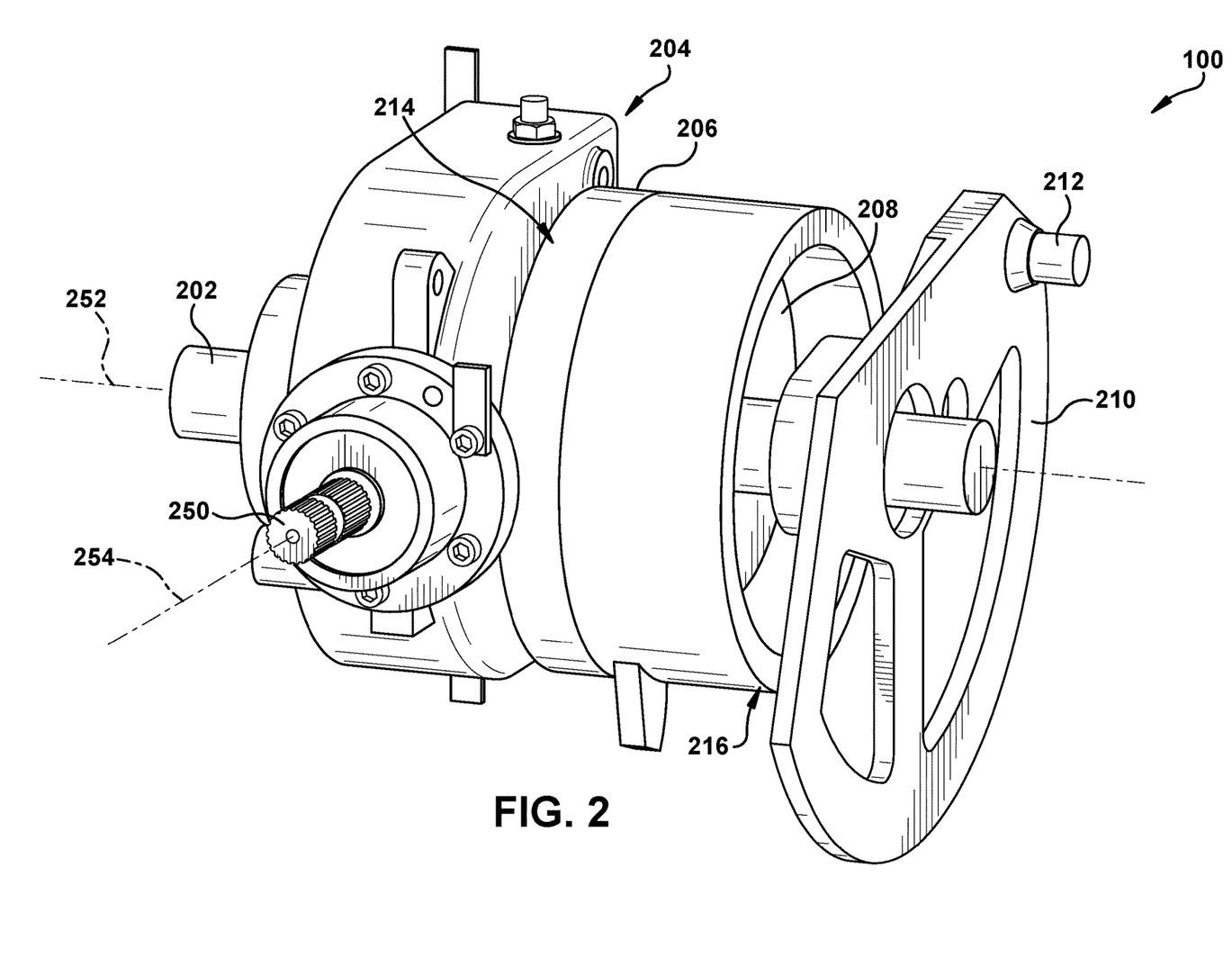
FIG. 2 is a component diagram illustrating one implementation of an example baler independent needle drive, as described herein.
Figure 3:
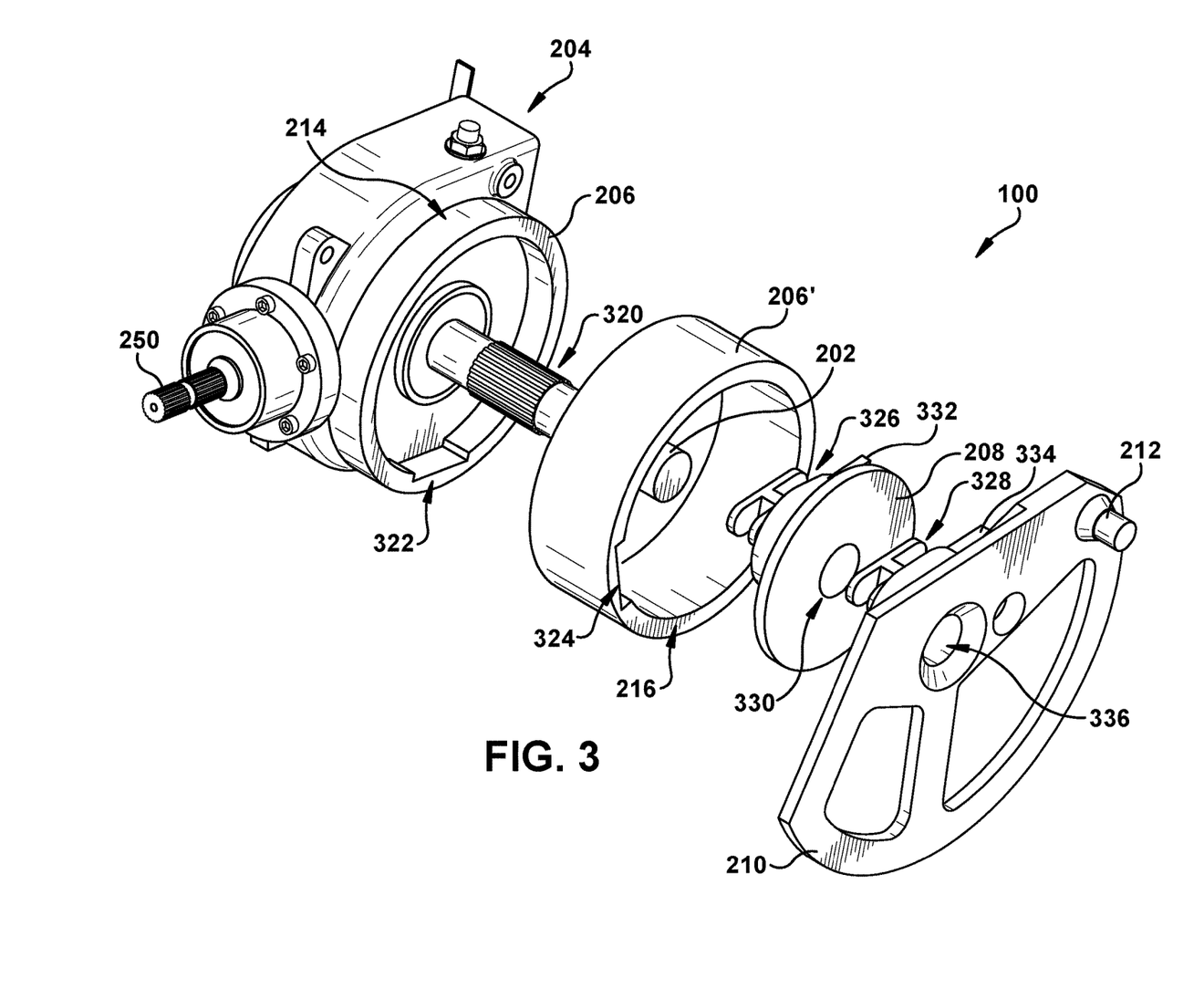
FIG. 3 is a component diagram illustrating an exploded view of one or more portions of one or more systems described herein.

FIG. 2 is a component diagram that illustrates an example implementation of an independent needle drive system 100, as described herein. FIG. 3 is a component diagram that illustrates an example implementation of the independent needle drive system 100, as described herein, in exploded view. In this implementation, the independent needle drive system 100 is operably coupled with a knotter gear box 204 that receives input power from a powered drive shaft 250. As an example, the powered drive shaft 250 can receive rotational power from a power input shaft (e.g., 166 of FIG. 1), such as a PTO powered by a coupled vehicle (e.g., 152 of FIG. 1). The gear box 204 is operably coupled with a clutch bowl 206 (e.g., through gears), and gears in the gear box 204 can selectably provide power to the clutch bowl 206 resulting in rotation of the clutch bowl 206 when powered gears in the gear box 204 are engaged (e.g., through coupled gears) with the clutch bowl 206. That is, for example, the powered drive shaft 250 provides rotational power around a second axis 252, and gears in the gear box provide the rotational power around a first axis 254 (e.g., relatively orthogonal to the first axis).

Further, as illustrated in FIGS. 2 and 3 in this example implementation, the clutch bowl 206 is extended further (e.g., is longer in the direction of the first axis 254) than existing clutch bowls in order to accommodate an inner (e.g., first) pocket 322 (e.g., recess or cut-out acting as a lug) disposed at or near a first end 214 of the clutch bowl 206, and an outer (e.g., second) pocket 324 (e.g., recess or cut-out acting as a lug) disposed at or near a second end 216 of the clutch bowl 206. That is, for example, current and existing clutch bowls found in a knotter assembly are configured to merely accommodate one lug or recess to operably engage one complementary pawl or dog. Of note, while typically a one-piece unit, the exploded view of FIG. 3 shows the clutch bowl 206 in two pieces for the purpose of illustrative demonstration. As an example, the extended portion of the clutch bowl 206 is indicated by piece 206' in two-piece illustration in FIG. 3.

Continuing with FIGS. 2 and 3, a knotter driven shaft 202 is rotationally disposed along the first axis 254. The knotter driven shaft 202 comprises a splined portion 320 that is configured to operably engage a complementary splined internal opening 330 of a knotter shaft clutch 208. The knotter driven shaft 202 is disposed through the knotter gear box 204 and extends out the opposite side to operably engage with a knotter drive assembly (not shown). In some implementations, the knotter driven shaft 202 is not operably engaged with gears in the knotter gear box 204, and freely rotates within the knotter gear box 204. As operably assembled, the knotter shaft clutch 208 is disposed in engagement with the splined portion 320 of the knotter driven shaft 202. Further, an inner clutch dog or pawl 326 is disposed on the knotter shaft clutch 208. In operation, as the clutch bowl 206 rotates, the inner clutch pocket 322 also rotates and engages the inner clutch dog or pawl 326. This results in rotation of the knotter shaft clutch 208, which, in turn, results in rotation of the knotter driven shaft 202 as a function of the engagement between the splined portion 320 of the knotter driven shaft 202 with the splined internal opening 330 of a knotter shaft clutch 208. In this way, for example, rotation power is provided to the knotter drive assembly (not shown).

As illustrated, a needle drive crank arm 210 (e.g., lift arm) is disposed on the knotter driven shaft 202 in an independent, free-floating arrangement. The needle drive crank arm 210 is configured to operably engaged with a needle drive (not shown) of a baler's knotter system, and comprises a central through bore 336 and a needle engagement arm 212 that operably engages (e.g., lifts) one or more needles of the needle drive. Further, an outer (e.g., or second) clutch dog or pawl is disposed on the needle drive crank arm 210. In operation, as the clutch bowl 206 rotates, the outer clutch pocket 324 also rotates and engages the outer clutch dog or pawl 328. This results in rotation of the needle drive crank arm 210, which, in turn, results in rotation of the needle engagement arm 212. In this way, because the needle drive crank arm 210 is independent from the knotter driven shaft 202 (e.g., free-floating), for example, drive power can be provided to the needle drive assembly (not shown), independently from the power provided to the knotter drive assembly from the knotter driven shaft 202.

In this way, as an example, providing for an independently driven, but synchronized, knotter driven shaft 202 and needle drive crank arm 210 allows the knotter driven shaft 202 to provide power to additional operations instead of merely waiting (e.g., dwell time) for the needle drive crank arm 210 to be operated (e.g., as in current and existing knotter systems). For example, the knotter system in balers opens billhooks to allow for knotting of twine, and having additional rotational power may allow for additional billhook opening operations to provide for improved knotting. In this way, for example, the opening of knotting jaws can help to prevent knots from being stuck, which can impede normal operation. Further, for example, the additional rotational power may be used for double joint in needles to allow for them to drop out of the way to mitigate improper knotting. It is contemplated that the additional rotational power, not used for the needle drive, can be used for other operations in the baler and knotting operation.

Additionally, as illustrated in FIGS. 2 and 3, the inner clutch pocket 322 is offset (e.g., by degrees of a circle) from the outer clutch pocket 324. That is, for example, the amount of offset (e.g., one-hundred degrees) can be fixed into the clutch bowl 206 to accommodate a desired offset (e.g., timing, based on a target speed of rotation) between activation of the knotter driven shaft 202 and independent activation of the needle drive crank arm 210. Further, the inner clutch dog or pawl 326 comprises an inner (e.g., first) declutching arm 332, and the outer clutch dog or pawl 328 comprises an outer (e.g., second) declutching arm 334.

In some implementations, the respective declutching arms 332, 334 are configured to operably engage with portions of the baler (e.g., bales, chains, sprockets, other predetermined contact point, etc.) to move the dogs or pawls 332, 334 out of engagement with their respective pockets 322, 324 to disengage the knotter driven shaft 202 and needle drive crank arm 210. That is, for example, the baler (e.g., 150 of FIG. 1) can comprise a first predetermined contact point in the baler that is configured to contact the first declutching arm 332, resulting in disengagement of the first dog 332 from the first pocket 322. Further, for example, the baler can comprise a second predetermined contact point in the baler that is configured to contact the second declutching arm 334, resulting in disengagement of the second dog 334 from the second pocket 324. As an example, the first and second contact points are configured (e.g., for the purposes of timing the knotter system) to disengage the respective dogs 332, 334 at predetermined position (e.g., corresponding to timing or times) for appropriate functioning of the knotter system. For example, because the respective pockets 322, 324 are offset in the clutch bowl, the engagement and disengagement are performed separately, and can be appropriately timed for the knotting operation based on the offset.

Figure 4A:
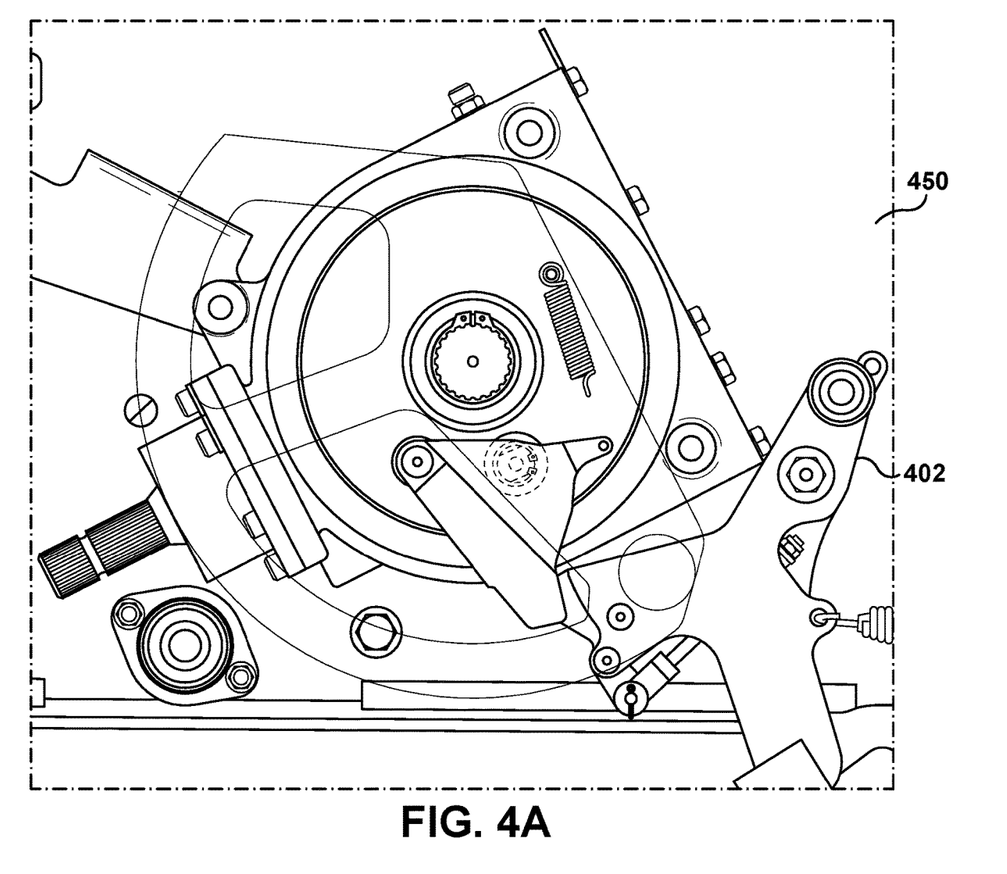
FIGS. 4A, 4B, and 4C are component diagrams illustrating an example implementation of one or more portions of the systems described herein.
Figure 4B:
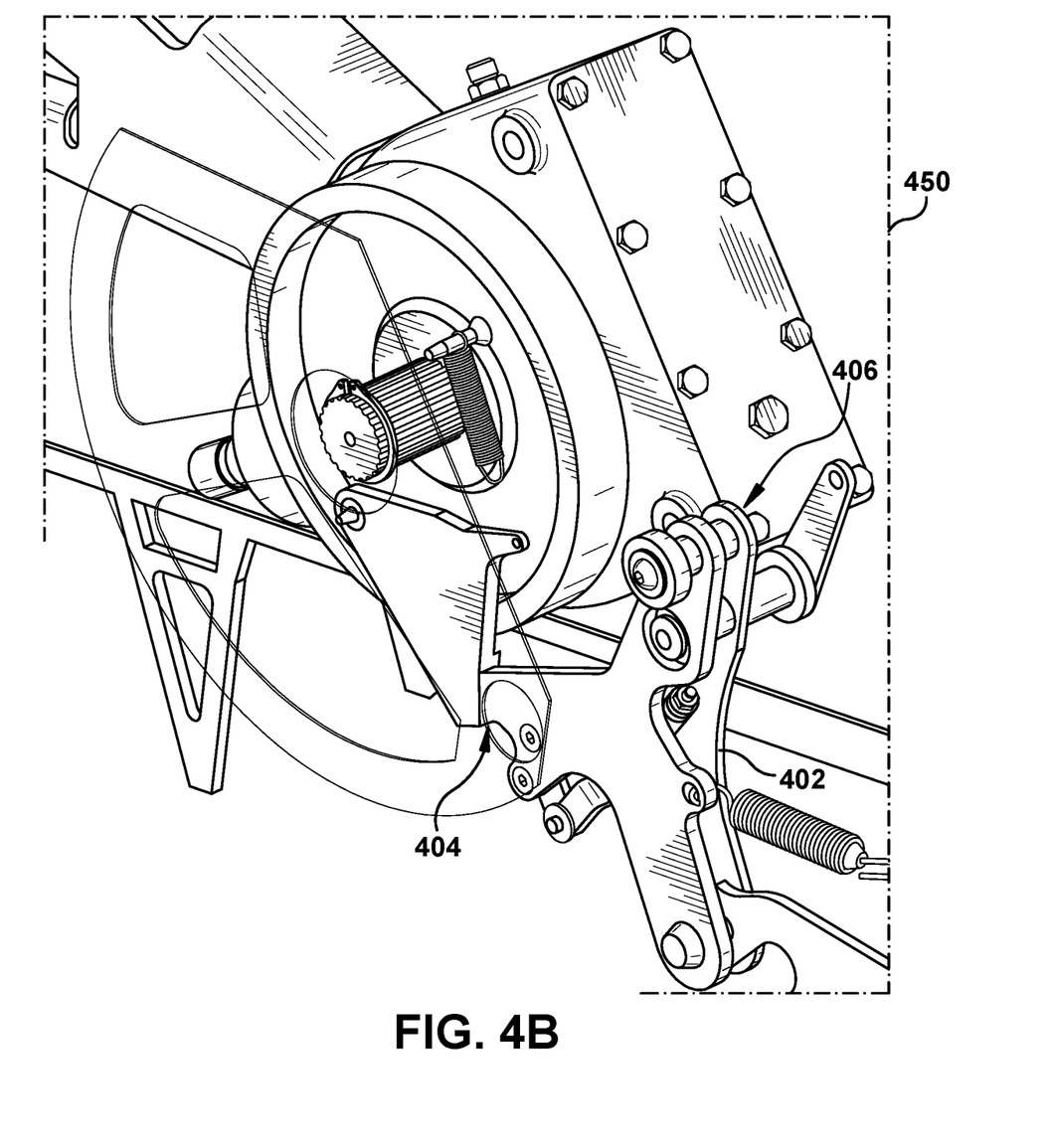
Figure 4C:
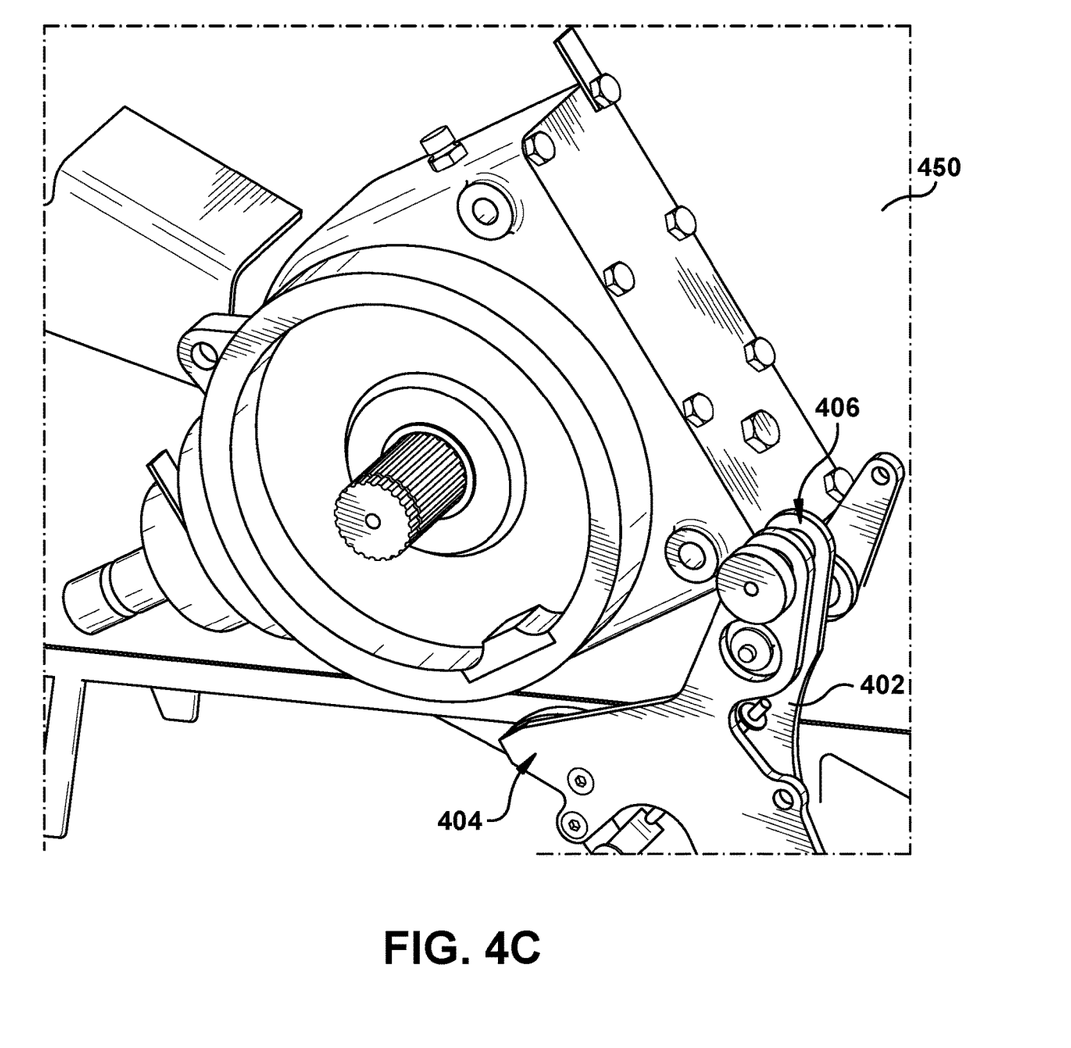

In some implementations, as illustrated in FIGS. 4A, 4B, and 4C, with continued reference to FIGS. 2 and 3, a declutching stop/trip arm 402 can be disposed on the baler frame 450 to act as the first predetermined contact point and/or the second predetermined contact point. That is, for example, the declutching stop/trip arm 402 can have a first contact point 404 and a second contact point 406 that are offset from each other, and configured to contact the respective declutching arms 332, 334 at the appropriate time. As an example, contacting the respective declutching arms 332, 334 at the appropriate time will move the respective pawls 332, 334 out of engagement with their respective pockets 322, 324 to disengage the knotter driven shaft 202 and needle drive crank arm 210 at the predetermined time during a cycle. In some implementations, the location, position, spacing, etc. of the first and second contact points 404, 406 can be preset to provide for the desired, predetermined timing of the declutching of the knotter driven shaft 202 and needle drive crank arm 210 during the cycle. In this way, for example, the time between the declutching of the knotter driven shaft 202 and needle drive crank arm 210 may be used for other operations, as described further herein.

With continued reference to FIGS. 2 and 3, as an example, the innovation described herein allows separate operation of the knotter driven shaft 202, and hence the knotter drive (not shown), from the needle drive crank arm 210, and hence the needle drive assembly (not shown). In this way, in this example, the rotational power provided by the knotter driven shaft 202 can be used for other operations, and not merely for a wasted dwell time between the action of the knotter drive and the action of the needle drive, as is the current state of the art using the rotational power from the same shaft. As an example, additional knotter actions may be employed using the knotter driven shaft 202 rotation, instead of merely one knotting action. That is, a knotter may have two additional actions thereby creating a more secure knot for the bales. That is, the knotter can rotate around and open the jaws to prevent the knot from being stuck; or there may be a double joint in the needles to allow the knot to drop out of the way. Additionally, as an example, the knotter shaft and needle drive may be driven at different (e.g., new) speeds, as the drives are now independent of each other. As another example, gear patterns for the knotter drive may be changed, such that reliability of the knotting may be improved by moving gearing to earlier and later in the phase as needed. It is anticipated that other uses of the independent knotter and needle drives may be devised and implemented.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A knotter system for a baler, comprising:
a clutch bowl engaged with a gear box that provides rotational power to the clutch bowl, the clutch bowl comprising:
a first clutch pocket disposed in an interior wall of the clutch bowl proximate to the gear box; and
a second clutch pocket disposed in the interior wall of the clutch bowl distally from the first clutch pocket with respect to the gear box, the first and second clutch pockets radially offset from each other;
a knotter driven shaft having a center of rotation disposed along a first axis, the knotter driven shaft extending through the gear box in a free-floating, rotational arrangement;
a knotter shaft clutch is engaged with the knotter driven shaft such that the knotter shaft clutch and the knotter driven shaft operably rotate together, the knotter shaft clutch comprising a first clutch dog that operably engages with the first clutch pocket to provide rotational power to the knotter shaft clutch; and
a needle drive crank arm disposed on the knotter driven shaft, the needle drive crank arm comprising a second clutch dog that operably engages with the second clutch pocket to provide rotational power to the needle drive crank arm.

2. The knotter system of claim 1, wherein the knotter driven shaft comprising a splined outer surface portion proximate the gear box.

3. The knotter system of claim 2, wherein the knotter driven shaft comprising a non-splined outer surface portion disposed distally from the splined outer surface portion with regard to the gear box.

4. The knotter system of claim 2, wherein the knotter shaft clutch comprising a central through bore that comprises internal splines complementary to the splined outer surface portion of the knotter driven shaft.

5. The knotter system of claim 3, wherein the needle drive crank arm comprising a central through bore that comprises a smooth inner wall to operably free-float on the non-splined outer surface portion of the knotter driven shaft, such that the knotter driven shaft rotates independently from the needle drive crank arm.

6. The knotter system of claim 1, wherein the offset between the first clutch pocket and the second clutch pocket is between greater than zero degree and less than one-hundred and eighty degrees.

7. The knotter system of claim 1, wherein the offset between the first clutch pocket and the second clutch pocket is approximately one-hundred degrees.

8. The knotter system of claim 1, wherein the offset between the first clutch pocket and the second clutch pocket is greater than one-hundred and eighty degrees.

9. The knotter system of claim 1, wherein the first clutch dog comprises a first declutching arm configured to operably disengage the first clutch dog from the first clutch pocket when the first declutching arm contacts a first predetermined disengagement contact point of the baler.

10. The knotter system of claim 1, wherein the second clutch dog comprises a second declutching arm configured to operably disengage the second clutch dog from the second clutch pocket when the second declutching arm contacts a second disengagement contact point of the baler.

11. A knotter system for a baler, comprising:
a clutch bowl comprising an annular-shaped wall having an interior surface, and comprising:
a first pocket disposed in the interior surface near a first end of the clutch bowl; and
a second pocket disposed in the interior surface near a second end of the clutch bowl;
a knotter driven shaft disposed centrally within the clutch bowl, the clutch bowl and the knotter driven shaft rotating independently from each other around a central axis;
a knotter shaft clutch operably engaged with the knotter driven shaft, the knotter shaft clutch comprising a first clutch dog that operably engages with the first pocket to transfer rotational power from the clutch bowl to the knotter driven shaft; and
a needle drive crank arm disposed on the knotter driven shaft in a free-floating arrangement, the needle drive crank arm comprising a second clutch dog that operably engages with the second pocket to transfer rotational power from the clutch bowl to the needle drive crank arm.

12. The system of claim 11, wherein the knotter driven shaft engaged with the knotter shaft clutch in a splined arrangement such that the knotter driven shaft and knotter shaft clutch rotate together.

13. The system of claim 11, wherein the needle drive crank arm comprising a smooth-walled central through bore that operably free-floats on a smooth surfaced portion of the knotter driven shaft, such that the knotter driven shaft rotates independently from the needle drive crank arm.

14. The system of claim 11, wherein the first pocket and the second pocket radially offset from each other.

15. The system of claim 14, wherein the offset between the first pocket and the second pocket is between greater than zero degree and less than one-hundred and eighty degrees.

16. The system of claim 11, wherein the offset between the first pocket and the second pocket is approximately one-hundred degrees.

17. The system of claim 11, wherein the clutch bowl powered by a gear box that receives power from a power take off input shaft of the baler.

18. The system of claim 11, wherein the first clutch dog comprises a first declutching arm configured to operably disengage the first clutch dog from the first pocket when the first declutching arm contacts a first predetermined disengagement contact point of the baler.

19. The system of claim 11, wherein the second clutch dog comprises a second declutching arm configured to operably disengage the second clutch dog from the second pocket when the second declutching arm contacts a second disengagement contact point of the baler.

20. A method of using an independent needle drive system that comprises a clutch bowl engaged with a gear box that provides rotational power to the clutch bowl, wherein the clutch bowl comprises a first clutch pocket disposed in an interior wall of the clutch bowl proximate to the gear box, and a second clutch pocket disposed in the interior wall of the clutch bowl distally from the first clutch pocket with respect to the gear box, the first and second clutch pockets radially offset from each other; a knotter driven shaft having a center of rotation disposed along a first axis; a knotter shaft clutch engaged with the knotter driven shaft such that the knotter shaft clutch and the knotter driven shaft operably rotate together, the knotter shaft clutch comprising a first clutch dog that operably engages with the first clutch pocket to provide rotational power to the knotter shaft clutch; and a needle drive crank arm disposed on the knotter driven shaft, the needle drive crank arm comprising a second clutch dog that operably engages with the second clutch pocket to provide rotational power to the needle drive crank arm, the method comprising:

provelope providing power to the gear box using a power take off input shaft;

engaging the gear box to rotate the clutch bowl such that the first clutch pocket engages the first clutch dog, and the second clutch pocket engages the second clutch dog;

disengaging the first clutch dog from the clutch bowl using a first declutching arm that operably disengages the first clutch dog from the first pocket when the first declutching arm contacts a first predetermined disengagement contact point of the baler; and disengaging the first clutch dog from the clutch bowl using a second declutching arm that operably disengages the second clutch dog from the second pocket when the second declutching arm contacts a second disengagement contact point of the baler.

* * * * *